United States Patent [19]

Streisand

[11] 4,076,962
[45] Feb. 28, 1978

[54] METHOD AND APPARATUS FOR RECEIVING DISPARATE SEQUENCES OF SPACED TONE BURSTS

[75] Inventor: Kenneth Streisand, East Brunswick, N.J.

[73] Assignee: Bell Telephone Laboratories, Incorporated, Murray Hill, N. J. 07974

[21] Appl. No.: 774,969

[22] Filed: Mar. 7, 1977

[51] Int. Cl.² .......................................... H04M 17/00
[52] U.S. Cl. ............................. 179/6.3 R; 179/84 VF
[58] Field of Search ................... 179/6.3 R, 6.31, 6.4, 179/6.5, 84 VF; 340/171 R, 167 A, 168 R; 328/112

[56] References Cited

U.S. PATENT DOCUMENTS

| | | | |
|---|---|---|---|
| 2,676,209 | 4/1954 | Joel, Jr. .............................. | 179/6.3 R |
| 3,069,502 | 12/1962 | Edstrom et al. .................. | 179/6.3 R |
| 3,428,751 | 2/1969 | Edington .......................... | 179/6.3 R |
| 3,453,389 | 7/1969 | Shaer ................................ | 179/7.1 R |
| 3,851,112 | 11/1974 | Kusan .............................. | 179/84 VF |
| 3,936,801 | 2/1976 | Shuman ........................... | 179/84 VF |
| 3,944,753 | 3/1976 | Proctor et al. .................. | 179/84 VF |
| 4,031,324 | 6/1977 | Dudonis ........................... | 179/6.3 R |
| 4,031,325 | 6/1977 | Dudonis et al. .................. | 179/6.3 R |

Primary Examiner—Kathleen H. Claffy
Assistant Examiner—Gerald L. Brigance
Attorney, Agent, or Firm—John Francis Moran

[57] ABSTRACT

This invention pertains to a method and arrangements that provide automatic detection of sequences of signals which previously required listening by operators in telephone systems to identify them. In a telephone system, certain information is transmitted using preselected signal sequences of tone bursts and silent intervals. These signal sequences are subjected to interference by speech and noise occurring in the telephone system. An arrangement is disclosed which reliably recognizes and identifies these signal sequences notwithstanding the apparent modification thereof due to the interference. In the process of recognizing these signal sequences, a three-stage recognition test is utilized to classify the durations of tone bursts and silent intervals in the signal sequences that occur. The validity of the signal sequence is checked by detecting inconsistent durations within the sequences. This feature is also utilized to indicate faulty apparatus used to generate these signal sequences. A dual arrangement is also disclosed wherein signal levels of a particular signal sequence in different transmission paths in telephone systems indicate the origin of the sequence. A level comparison which is successful for a preselected portion of the total duration of the signal sequence provides a margin of tolerance for interference in the sequence.

14 Claims, 11 Drawing Figures

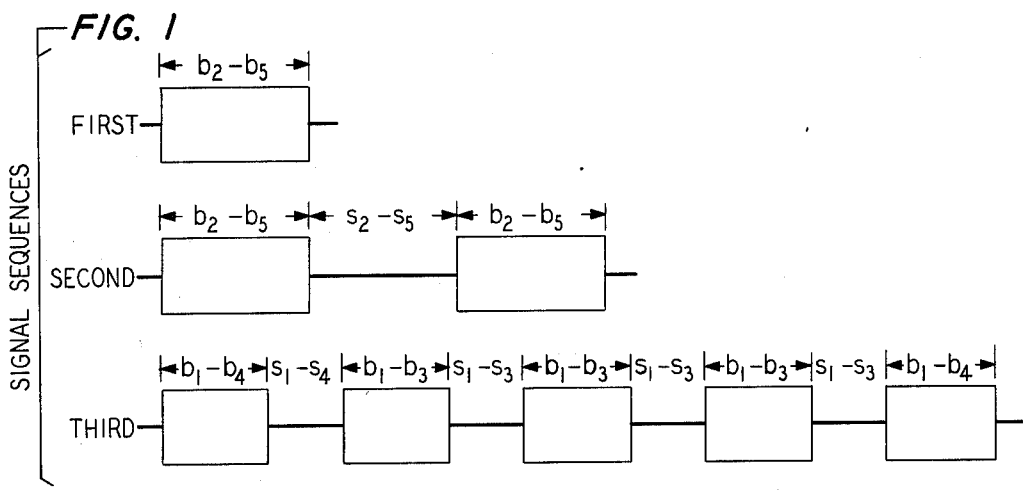
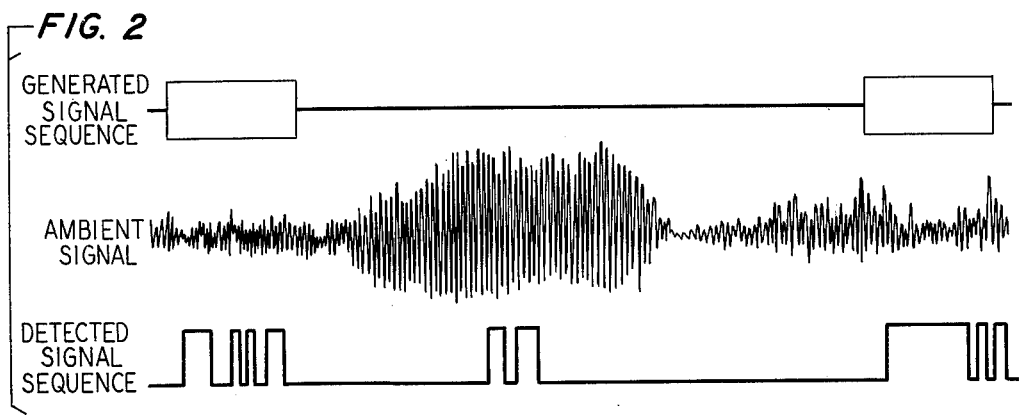
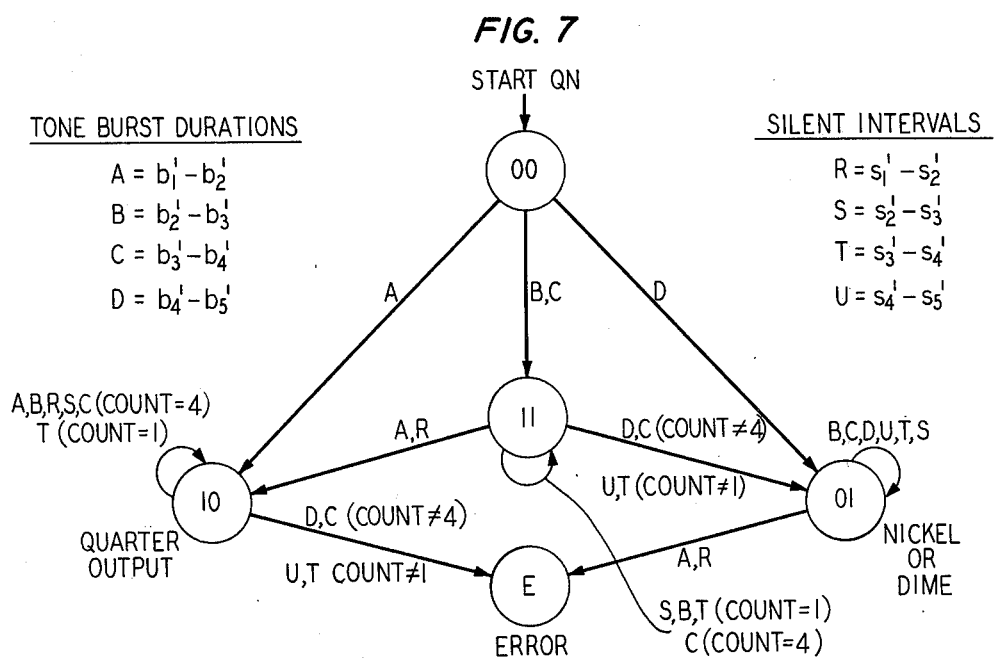

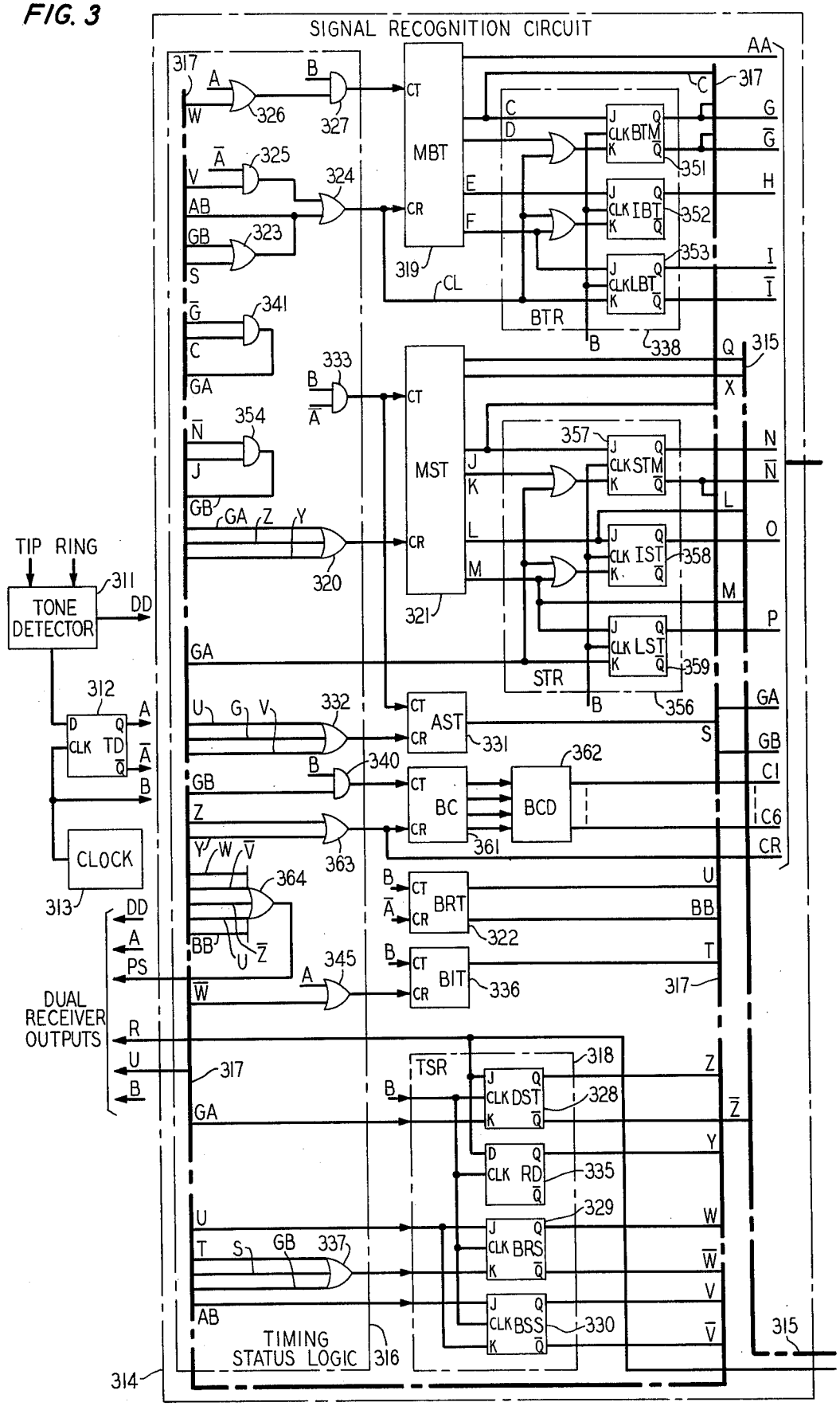

4,076,962

METHOD AND APPARATUS FOR RECEIVING DISPARATE SEQUENCES OF SPACED TONE BURSTS

FIELD OF THE USE OF THE INVENTION

This invention generally relates to telephone signaling systems and, more particularly, to the type of telephone signaling utilized by coin operated pay stations in signaling coin deposits. Even more specifically, this invention relates to the automatic identification of coin deposit signals, such as that employed in the Automatic Coin Toll Service (ACTS) subsystem of the Bell System's Traffic Service Position System (TSPS) wherein it is contemplated to eliminate operator assistance in the normal placement of toll calls from pay telephone stations.

BACKGROUND OF THE INVENTION

A number of techniques and arrangements have been devised for coin pay station telephones to signal coin deposits to either operators or coin deposit signal receivers. The labor saving advantage of the latter is rather obvious. However, automatic electronic recognition of coin deposit signals in the presence of speech and noise has left something to be desired in terms of reliability compared to the trained human operator. For example, speech and/or noise may produce sufficiently strong frequency components which duplicate the tone burst portion of a coin deposit signal and are indistinguishable therefrom. This phenomenon is generally known as a simulation or as a "talk-off". A converse effect called "talk-down" prevents the detection of the tone burst portion of the coin deposit signal by the presence of sufficient signal energy at other frequencies than that of the tone burst signal.

Automatic detection is further hampered by the nature of the most common type of coin deposit signal which includes mechanically generated timing intervals of one or more tone bursts each followed by an appropriate silent interval. All of these intervals are subject to the imprecise timing of mechanical devices. Each deposited coin is indicated by a specific sequence format. More specifically, a deposited nickel is signaled by one tone burst followed by a silent interval. A first stepping period, which includes a tone burst and subsequent silent interval, followed by a second tone burst, indicate a deposited dime. Finally, a quarter deposit produces four similar stepping periods of shorter duration followed by a fifth tone burst and subsequent silent interval.

The generally imprecise mechanical arrangements in the pay stations which generate these timing intervals have their operation affected by wide swings in humidity, ambient temperature variations, and mechanical wear experiences by repeated use. All of the foregoing problems must be accounted for to detect coin tone deposit signals reliably by electronic means.

Another factor to be considered in automated coin deposit signal detection is the possibility of deceptive practices utilized to defraud the telephone operating company of toll charges for telephone calls from pay station telephones. Fortunately, the manner in which telephone connections are established allows the telephone company to identify valid coin deposit signals on the basis of signal levels present in different portions of transmission paths. Due to the uncontrolled signal ambient in these telephone connections, a straightforward signal level comparison technique is not always reliable.

It is an object of my invention to detect signal sequences automatically by providing a tolerance to interruptions appearing in both the tone burst and silent intervals of the sequence.

A further object is to utilize a level comparison of signal sequences with a margin of tolerance to signal inteference in different portions of transmission paths in a telephone system to identify the location at which the signal sequence originated to ascertain the validity thereof.

SUMMARY OF THE INVENTION

In some of its broader aspects, the invention takes the form of apparatus and a method for detecting and identifying disparate preselected signal sequences of spaced tone bursts. Since the signal sequences are subjected to interference by speech and/or noise, tone burst detection may be interrupted and false detection may occur during the spaces. After signal persistence of detected tone burst is satisfied for a predetermined period, the apparatus and method tolerate interruptions as the total duration of the detected tone burst is ascertained while indicating satisfaction of a predetermined minimum duration. If, however, the total accumulation of interruption intervals exceeds a second predetermined duration, the apparatus and method returns to an initial state before satisfaction of signal persistence. Once the minimum tone burst duration occurs, the total of interruptions is accumulated to ascertain the end of the detected tone burst. The accumulation continues to determine the duration of the space following the detected tone burst. Logic circuitry utilizes the duration of the detected tone burst and space to indicate the occurrence of a particular one of the preselected signal sequences.

In some of its more specific aspects, the invention will bridge up to a prescribed interval per interruption once the signal persistence is satisfied. If the interruption exceeds the prescribed interval, measurement of the detected tone burst duration is suspended until it reoccurs. If the tone burst detection persists continuously to satisfy signal persistence, the total accumulation of interruptions is reset to zero if the minimum tone burst duration is not reached.

In some further specific aspects of the invention to the logic circuitry comprises gates and registers. The latter is used to store durations of tone bursts and spaces which the gates compare for consistencies with a preselected signal sequence. Further gates are utilized to detect one of a plurality of preselected error conditions. Occurrence of an error condition is used to override indication of a valid signal sequence and to identify possible malfunctions in apparatus used to generate the preselected signal sequences.

A further aspect of the invention involving the area of multiple arrangements for detecting signal sequences in different portions of telephone transmission paths utilizes a signal level comparison therebetween. The comparison serves to indicate the origin of signal sequences and thus to indicate generated signal sequences of possible fraudulent origin. A margin of tolerance for interference in the signal sequences is provided by requiring the comparison to be within prescribed limits, a designated portion of the time during the tone burst portions of signal sequences.

BRIEF DESCRIPTION OF THE DRAWING

A more complete understanding of the invention and the various features, additional objects, and advantages thereof may be more readily understood by reference to the following detailed description in conjunction with the drawings.

FIG. 1 represents three signal sequences used to identify denominations of deposits.

FIG. 2 serves to illustrate the effect of an ambient signal upon signal detection of a generated signal sequence.

FIGS. 3, 4, and 5, when juxtapositioned in accordance with FIG. 6 provide an overall circuit diagram of an illustrative embodiment of the invention.

FIG. 7 is a state diagram used to explain the operation of the circuit of FIG. 4.

DETAILED DESCRIPTION

Figure 4:
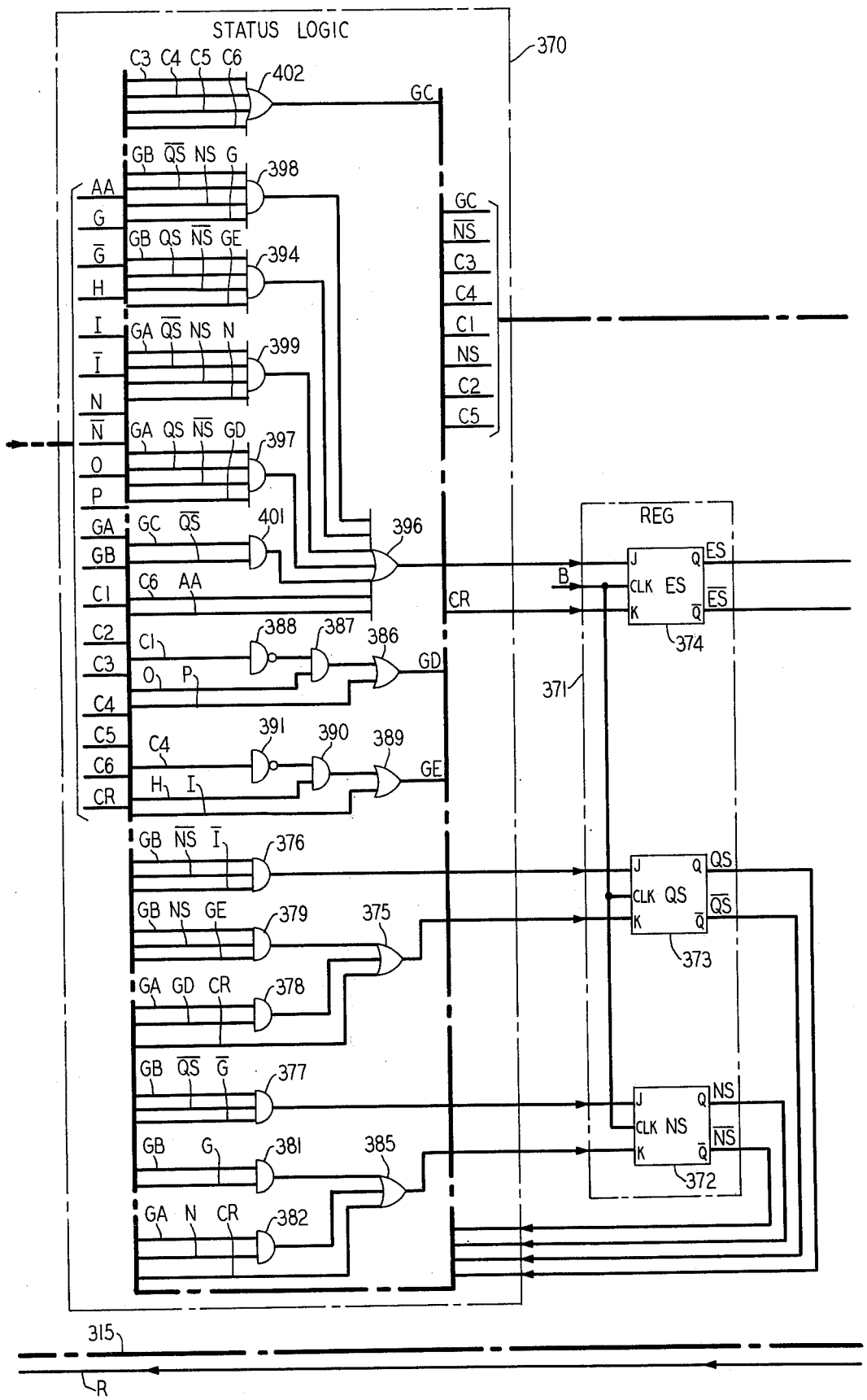

In order to provide a comprehensive explanation of the inventive principles, the nature of the coin deposit signals will now be considered. As previously mentioned, signal timing although imprecisely defined, plays a primary role in distinguishing coin deposit signals from each other and from the ambient signals in the system which will include an uncontrolled probable variety of possible combinations of speech from various sources and random occurring noise.

FIG. 1 depicts the general timing format of three signal sequences respectively indicative of nickel, dime and quarter coin deposit signals. The symbols in FIG. 1 indicate ranges of various durations of different portions of the coin deposit signal in units of time. Also designated from dime and quarter coin deposit signals are stepping periods (SP). For example, the tone burst duration for a nickel deposit ranges from $b_2$ to $b_5$ whereas the first tone burst of a quarter deposit ranges from $b_1$ to $b_4$. The durations for the silent intervals are likewise represented. In general, $b_1 < b_2 < b_3$ etc., and the same is true for $s_1 < s_2 < s_3$ etc. In other words, the quarter deposit signal has shorter durations in addition to a greater number of tone burst durations. As previously discussed, a great deal of imprecision exists in these intervals due to the mechanical arrangements that perform the signal timing in the coin pay stations and the variety of environments in which they must function.

FIG. 2 illustrates the effect of the signal ambient on a typical coin deposit signal. Typically, the coin deposit signal receivers are a centralized function wherein a considerable distance exists between the location of the coin pay telephone station and the coin deposit signal receiver. The detected signal under these conditions suffers from interruptions or holes in the tone bursts (partial talk-downs) and from signal appearances within the silent interval (partial talk-offs). The terms of talk-downs and talk-offs are respectively reserved for complete instances in which any known electronic detection technique would fail to recognize a valid coin deposit signal or would produce a false signal recognition. The inventive coin deposit signal receiver, accordingly, does allow for signal disruptions of partial talk-downs and talk-offs and notwithstanding their occurrences provides reliable signal detection.

A typical application of the disclosed coin deposit signal receiver is in the Bell System automatic coin toll subsystem associated with the TSPS system. A combination of these systems is disclosed in FIG. 1 of a co-pending patent application of R. M. Dudonis, having a common assignee, entitled "Automatic Coin Arrangement Providing Interference Free Coin Deposit Detection During Announcements", filed on May 24, 1976, Ser. No. 689,600, now U.S. Pat. No. 4,031,324, which issued on June 21, 1977. Further detailed information on the TSPS system is also disclosed in U.S. Pat. No. 3,484,560 issued to R. J. Jaeger, Jr., et al on Dec. 16, 1966.

Figure 5:
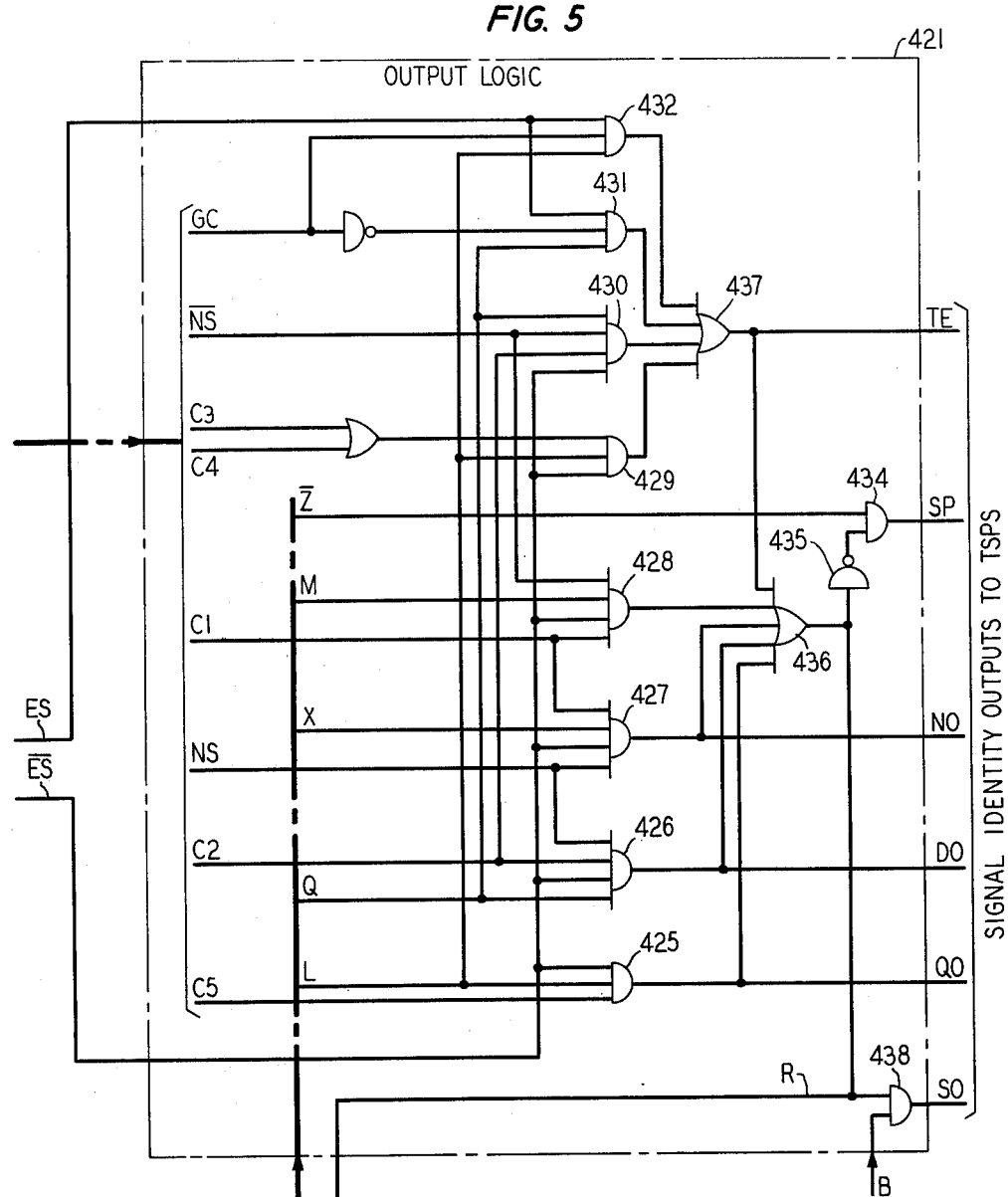
Figure 6:
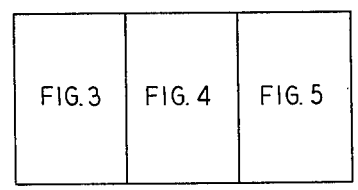

The overall diagram of the coin deposit receiver includes FIGS. 3, 4 and 5 arranged in accordance with FIG. 6. Each of these figures is a diagram of a functionally divided portion of the overall receiver. The circuit of FIG. 3 provides the signal interface with the telephone system. In accordance with the foregoing discussion of the coin deposit signal in the signal ambient, the signal format is rather poorly defined and the circuit of FIG. 3 classifies this signal after a determination of initial validity. The circuit of FIG. 4 provides the initial and intermediate coin classification function while the circuit of FIG. 5 provides the final validity test and demonination signal outputs for the telephone system.

In FIG. 3, the tip and ring conductors of an operator type loop are applied to tone detector 311. Detector 311 is a conventional arrangement of analog circuitry for the most part comprising a preamplifier, limitators, bandpass and band-elimination filters, one or more level detectors and logic circuitry. The output of tone detector 311 goes high to indicate the presence of a tone burst that is within preselected amplitude and frequency requirements. The tone burst may include one or more coincident frequency tones. In practice, a plurality of simultaneous single frequency tones served well as the tone burst portion of the coin deposit signal. Of course, those skilled in the art may readily choose any desired frequency or combination of frequencies in addition to any specific signaling format to provide the signal detecting function utilized in the application of the inventive principles of this illustrative embodiment.

Tone detector 311 functions primarily to provide an output which accurately tracks the tone burst portion of the signal. However, practical circuits of this type also exhibit an overall delay and a shortening of the tone burst durations due to the final intervals associated with filter buildup and decay and detector hangover. Typically, the buildup and the decay may have respective values of approximately 5 milliseconds and 3 milliseconds in actual circuits. When one is aware of these characteristics of the tone detection circuit, the remaining circuitry which utilizes timing functions may be readily designed to compensate for same.

Another well-known design consideration of detector 311 is the conventional trade-off between immunity to talk-downs and susceptibility to talk-offs. Since the coin deposit signal constitutes equally significant signal portions of tone bursts and silent intervals, detector 311 cannot be designed to respond more favorably to one signal portion at the expense of another.

The output of tone detector 311 is applied to flip-flop 312 along with the signal from clock 313. The complementary outputs of flip-flop 312 therefore change in accordance with the occurrence of the clocking pulses to indicate the presence of a total burst. These outputs and the clock signal whch have letter designations in FIG. 3 are all applied to portions of signal recognition circuit 314 with corresponding letter designations.

Signal recognition circuit 314 utilizes a three-stage signal recognition test in the process of classifying the durations of the tone bursts and silent intervals including their number of occurrences in the coin deposit signal. After satisfaction of the first stage of signal recognition which is an initial signal persistence criterion, this classifying function is performed while tolerating signal interruptions in the tone burst and momentary signal appearances within the silent intervals. As is shown in FIG. 3, circuit 314 includes a plurality of gates collectively designated as timing status logic 316, which control various timers in circuit 314. Also included in circuit 314 are various registers which maintain status information so that the circuit provides outputs indicative of its exact position in the three-stage signal recognition test. The various timers and registers supply outputs which are interconnected to the gates in logic 316 by a multiple conductor connection designated by heavy dashed line 317. Single conductors terminating at line 317 designated by the same letters are electrically connected together. The same type of letter designation technique is used for the output cable represented by heavy dashed line 315.

The primary function of circuit 314 is to recognize the coin deposit signal notwithstanding the signal interruptions associated with speech activity and noise from various sources being imposed thereon. Recognition circuit 314 therefore utilizes preselected criteria to characterize the coin deposit signal so that only certain combinations of input signals are applied to coin status logic 370 of FIG. 4 even though the original line signal from tone detector 311 is subject to wide variations of timing, amplitude, and frequencies. These signals to the coin status logic circuitry 370 indicate specific ranges of duration into which the tone burst and silent interval of the coin deposit signal fell. Coin status logic compares these signal portions, i.e., tone burst, silent interval, and number of occurrences, with preselected coin criteria to identify the coin deposit signal and hence the denomination of the deposited coin at the signaling pay station telephone. If an unresolvable inconsistency exists among portions of a coin deposit signal, an error signal is generated instead of the coin denomination signal.

The configuration of the circuitry of FIG. 3 will now be described in the context of operation primarily including only the relevant components responsible for the particular stage of operation currently being described. Initially, the circuit of FIG. 3 is in the idle state. Tone detector 311 therefore produces a low or "0" level output indicative of the absence of a tone burst and flip-flop 312 produces a "0" and a high or logical "1" output, respectively, at outputs connected to conductors A and $\overline{A}$. The logical "1" on $\overline{A}$ is applied to the clear (CR) input of main burst timer 319 through AND gate 325 and OR gate 324. AND gate 325 is enabled by an output of Timing Status Register (TSR) 318. Register 318 includes three conventional JK flip-flops and a D type flip-flop. The particular output of concern, is the Q output of Burst/Silent Status (BSS) flip-flop 330 which is in the set state. Accordingly, flip-flop 330 produces a "1" level signal on conductor V which enables gate 325. With respect to all flip-flops in the overall receiver, the convention used throughout this discussion will be that a set state of flip-flop produces a "1" level signal at the Q output. A reset or clear state conversely will produce a "1" level signal at the complementary $\overline{Q}$ output of the flip-flop.

Timer 319 serves as the main burst timer and is accordingly labeled MBT while timer 312 is labeled MST for main silent timer. Both of these timers, as well as the other timers in FIG. 3, each have a count (CT) and clear (CR) input. It should be evident to those skilled in the art that these timers in addition to other components in the overall coin deposit receiver are conventional components readily available and generally used in the form of integrated circuits. A "1" on the clear input overrides the count input and sets the counter to a zero count. When the clear signal applied to a counter of FIG. 3 switches to a low or logical "0" level, that counter is incremented by "1" for each period of the clock signal applied to the count input.

Disable Silent Timer flip-flop 328 of register 318 is also in the set state. The "1" on conductor Z holds MST timer 321 to zero count acting through OR gate 320. Accordingly, both of the main timers are inactive even though the clock signal may be applied to their other input. Burst Recognition Timer (BRT) 322 is also cleared to zero count by the "1" level on conductor $\overline{A}$. In the idle state, the circuit is ready to respond to the occurrence of a tone burst which is signaled by the change of the logic level outputs of flip-flop 312. No operative outputs for application to coin status logic 370 are produced while the receiver is in the idle state.

Upon the occurrence of a tone burst, the output of detector 311 goes high and the outputs of flip-flop 312 switch so a high is present on conductor A. The complementary output of flip-flop 312 or low level on conductor $\overline{A}$ enables BRT timer 322 to respond to the clock signal on conductor B. Timer 322 is now incremented once for each period of the signal from clock 313 while the tone burst presence is being detected. If the detected presence of the tone burst is interrupted for any reason, the signal on $\overline{A}$ goes high and clears timer 322 to zero count. Before any subsequent signal timing occurs, this first stage of signal recognition which is a signal persistence requirement for a predetermined duration of continuous detected tone burst presence must be satisfied.

The "0" level on conductor $\overline{A}$ also changes the outputs of AND gate 325 and OR gate 324 to a "0" level coincident with the start of BRT timer 322 at the beginning of the signal persistence test. The "1" level on conductor A propagates through OR gate 326 and enables AND gate 327 for the passage of the signal from clock 313 to the MBT timer. All the other timers in the circuit of FIG. 3 in this stage of operation are held to a zero count by the respective clear signals applied thereto. Thus, only timers 319 and 322 are incremented by the clock signal.

When the persistence test is satisfied, the output of BRT timer 322 produces a pulse on conductor U. This pulse in conjunction with the clock signal changes state of Burst Recognition Status (BRS) flip-flop 329 of TSR Register 318 from clear to set and the Burst/Silence Status (BSS) 330 flip-flop from set to clear. Thus, "1" and "0" levels are, respectively, on conductors W and $\overline{W}$, and there is a "0" on V. Timer 321 is not affected by its associated gates, but OR gate 332 by virtue of the changed output of flip-flop 330, removes the "1" clear signal on Auxiliary Silent Timer (AST) 331. Timer 331 is now incremented in response to the signal from clock 313 during interruptions in the detected presence of the tone burst. This clock signal is applied to timer 331 when AND gate 333 is enabled by the "1" level on conductor $\overline{A}$. Also the "1" on lead W, through OR gates 326 allows MBT timer 319 to count when clock signals on lead B are applied to gate 327, even during interruptions in the detected presence of the tone burst. Signal recognition circuit 314, at this point, is in the second stage of operation.

In the second stage and also the third stage of operation, Burst Interruption Timer (BIT) 336 enables circuit 314 to bridge holes in the tone burst portion of the coin deposit signal for intervals that do not exceed its full count. As long as the interruption does not exceed this predetermined interval, MBT timer 319 will continue to operate in the same manner as though the tone burst were present. If the interruption should exceed the bridging interval, timer 336 reaches a full count of clock pulses and produces a pulse output on conductor T. This pulse is applied by OR gate 337 to BRS flip-flop 329. Upon the occurrence of the coincident clock pulse, the levels of the two outputs of flip-flop 329 are switched. Now a low signal on conductor A at OR gate 326 changes the output of that gate to low and inhibits clock pulses from incrementing MBT timer 319 during silent intervals. Thus, timer 319 is only incremented when the tone burst presence is detected, but maintains the position of its count in the absence of the tone burst. If the tone burst signal should now reappear for a duration equal to the signal persistence duration in the first stage of operation, BIT timer 336 will again function to bridge momentary interruptions which do not exceed its full count. In fact, during the second or third stage of operation anytime BRT timer 322 reaches a full count, BIT timer 336 will provide the bridging function wherein MBT timer 319 counts during the bridged interruption. This operation is accomplished when BRT timer 322 produces a high output on conductor U. Since conductor U provides an input for BRS flip-flop 329, the flip-flop is placed in the set state upon the occurrence of the next clock pulse on conductor B. Then flip-flop 329 provides a low output on conductor $\overline{W}$ which removes the clear signal from BIT timer 336 via OR gate 345 during interruptions in the signal. BIT timer 336 will therefore be incremented by the clock signal. Should a particular interruption exceed the bridging interval, MBT timer 319 will count only during the portion of the interruption that is bridged.

It should be pointed out that coincident with the interruption of the tone burst signal, AST timer 331 is also incremented on each clock pulse during the time that the tone burst signal is interrupted. Timer 331 accumulates the total duration of the interruption intervals. However, AST timer 331 is reset to zero if the signal resumes and persists long enough for the BRT timer 322 to produce a pulse on conductor U. This pulse propagates through gate 332 and clears AST timer 331 to zero count. Should the accumulation exceed a predetermined interval, e.g., $s_{1'}$, which corresponds to a given count by AST timer 331, circuit 314 will be placed back in the idle state. More specifically, AST timer 331 then produces a pulse at full count on conductor S which is applied to OR gates 323 and 337. The pulse at gate 323 resets MBT timer 319 to zero count via OR gate 324 and sets BSS flip-flop 330, via conductor AB and the clock pulse on conductor B. The output of OR gate 324 will also clear all the flip-flops in Burst Timing Register (BRT) 338. However, consistent with the foregoing operation as discussed these flip-flops which were initially clear should have never been set. The same pulse back at gate 337 sets BRS flip-flop 329 of register 328 to the clear state. The sole function of AST timer 331 is thus to place circuit 314 in the idle state when the total accumulation of the interruptions in the tone burst exceed a preselected interval. Of course, this must occur before the MBT timer 319 determines that a conditionally valid tone burst is received. Also anytime BRT timer reaches a full count its output is responsible for resetting AST timer 331 to zero count.

If one assumes that the AST timer 331 does not place circuit 314 back into the idle state, MBT timer 319 will continue to be incremented during the detected presence of the tone burst signal or during the undetected presence of the signal if the circuit is in the bridging mode. When MBT timer 319 reaches a predetermined minimum duration, e.g., $b_{1'}$, it produces a "1" on conductor C.

Signal recognition circuit 314 is now in its third stage of operation. At this point, the tone burst is considered as only being conditionally valid. This "1" in conjunction with the high signal on conductor $\overline{G}$ switches the output of AND gate 341 to a logical "1" level on conductor GA. When conductor GA is at a "1" level, the state of the Silence Timing Register 356 is gated into the status logic circuit 370, so that the consistency of the silent interval just passed can be checked with previous bursts and silent intervals. Silence Timing Register 356 will have a setting based on the previous coin deposit since it is only reset when siginal recognition circuit 314 enters the third stage of recognition. Status logic circuit 370, however, ignores outputs of STR register 356 until after it receives the first output of Burst Timing Register 338. That is, the initial setting of status logic 370 is made at the completion of the first burst. The output of OR gate 320 also goes high and reduces the count of MST timer 321 to zero. On the next clock pulse the "1" on conductor GA will cause all flip-flops in the Silence Timing Register 356 to be reset, and GA will return to "0".

Upon the occurrence of the next clock pulse, the high on conductor GA clears Disable Silent Timer flip-flop 328 changing the level on conductor Z to "0". Now all inputs to OR gate 320 are "0" removing the clear on MST timer 321. Timer 321 will now count via gate 333 during the detected absence of the tone burst. At the same time, the high on conductor C in conjunction with the clock pulse places Burst Timing Minimum (BTM) flip-flop 351 of BTR register 338 in the set state. Conductor $\overline{G}$ is now "0" and conductor GA is "0". If the signal on conductor A remains high, indicating the tone burst, MBT timer 319 will continue to be incremented by clock 313. As the count passes through longer predetermined intervals, i.e., $b_2$, $b_{3'}$, etc., additional output pules will be produced on appropriate remaining outputs of timer 319. Correspondingly, the other flip-flops, such as Intermediate Burst Timing (IBT) 352 and Long Burst Timing (LBT) 353, in registers 338 will respond to these pulses and indicate the duration of the tone burst. Also with the change of signal on Z from "0" to "1", the coin and output logic portion of the receiver indicates to TSPS that coin processing is underway.

When the signal on conductor A goes low to indicate the absence of the tone burst, MST timer 321 will start counting. If BRS flip-flop 329 is set, MBT 319 will be in the bridging mode and BIT timer 336 will also start counting. If the low signal on conductor A persists long enough for timer 336 to reach its full count, an output pulse will be produced. This pulse acting through gate 337 clears BRS flip-flop 329 which takes MBT timer 319 out of the bridging mode. The output of flip-flop 329 on conductor W goes low. At gate 326, both inputs are now long so that its low output inhibits the clock pulses at gate 327 from incrementing MBT timer 319 during the absence of the tone burst. If the tone returns the MBT timer 319 will be incremented by clock pulses and if the tone persists long enough for the BRS flip-flop 329 to be set, MBT timer 319 will be in bridging mode once more.

Meanwhile, MST timer 321 continues to be incremented in the absence of a detected tone burst. When timer 321 reaches a given count indicative of a predetermined interval, $s_{1'}$, its output on conductor J goes high. At this point, the tone burst is considered to be completed and signal recognition circuit 314 is placed back into the first stage of operation. The "1" level on conductor J in conjunction with the high signal on conductor $\bar{N}$ switches the output of AND gate 354 to a logical "1" level on conductor GB. This "1" on GB gates the output status of Burst Timing Register 338 to coin logic circuit 370. On the first burst of the coin deposit these outputs serve to indicate tone burst durations of the coin deposit signal; on subsequent bursts they are used to check for consistency with previous bursts and silent intervals that have occurred. In this case there were no previous burst intervals so that these outputs of register 338 are the first entry into coin logic circuit 370. The high level signal on conductor GB is also used to enable AND gate 340. Since the clock signal is present on conductor B, the output of gate 340 produces a pulse which increments Burst Counter (BC) 361. Counter 361, which is incremented from 0 through 15, is a 4-bit counter of the same type as MBT timer 319 and MBT timer 321. The outputs of Counter 361 are in binary form as applied to Burst Counter Decoder (BCD) 362. A high on the appropriate one of outputs C1 through C6 of BC decoder 362 indicates the count of counter 361 and provides outputs for coin status logic 370 of FIG. 4 and output logic 421 of FIG. 5.

The high or "1" level on conductor GB will propagate through OR gates 323 and 324 to clear MBT timer 319. On the next clock pulse, this clear signal will also reset all flip-flops in BTR register 338. At this point, both timer 319 and register 338 have already provided outputs for coin status logic 370 which serve to classify the duration of the tone burst in terms of one of the preselected ranges. The clear signal on conductor GB will return to a "0" level as $\bar{N}$ becomes "0" at this time.

Associated with MST timer 321 is Silent Timing Register (STR) 356 which includes Silent Timing Minimum (STM) flip-flop 357, Intermediate Silent Timing (IST) flip-flop 358, and Long Silent Timing (LST) flip-flop 359. Register 356 operates in a manner similar to register 338 but retains output levels indicative of the duration of the silent interval instead of that of the tone burst. In this case, flip-flop 357 switches into the set state and will remain in that state unless MST timer 321 produces further outputs in response to the silent interval of increased duration. In response to these additional outputs, the appropriate flip-flop in register 356 is placed in the set state and will remain so that the outputs of registers 356 and 338 can be compared for consistency by coin logic circuit 370 of FIG. 4.

The operation of signal recognition circuit 314 described thus far takes place for each stepping period which includes tone burst of a preselected duration followed by an appropriate silent interval of a coin deposit signal. In the case of a coin deposit signal indicative of a nickel deposit, there is only one stepping period. With one exception for any of the coin deposit signals, when the final stepping period has been deemed to have occurred by the overall circuit of FIG. 6, either a coin denomination signal or error signal is produced by the coin outputs of FIG. 5. This exception is the receipt of a single quarter type of tone burst for which the receiver outputs an end of processing signal but does not indicate a coin denomination or error output signal. Whenever any output signal occurs from the receiver, a high signal is produced on the reset (R) conductor which is fed back to RD flip-flop 335 in signal recognition circuit 314. Flip-flop 335, upon the occurrence of the concurrent clock pulse produces a high pulse signal on conductor Y with a duration of a clock period. This pulse propagates through OR gates 320 and 363 and clears to zero count, respectively, MST timer 321 and BC counter 361.

The high on conductor R serves to place the overall receiver back into the idle state. As an additional precaution, whenever the receiver of FIG. 6 goes into the idle state, DST flip-flop 328 goes into the set state and maintains clears on both counters 321 and 361 via conductor Z and OR gates and 363, respectively. This second clearing operation serves to prevent false responses to disruptive battery noises or electromagnetic pickups during long silent periods between coin deposit signals. In a situation wherein one coin deposit signal rapidly follows another coin deposit signal, DST flip-flop may never be set; however, MST timer 321 and BC counter 361 will be reset by RD flip-flop 335.

The additional dual receiver outputs depicted in FIG. 3 will be discussed in greater detail in connection with the dual receiver arrangement of FIG. 10. One of the dual receiver outputs is a high signal level produced by OR gate 364 one clock period before the end of the first persistence timing interval. This high on output PS will remain as long as the receiver is undergoing processing of a coin deposit signal or what appears to be a coin deposit signal.

The next function part of the receiver of FIG. 6 is coin status logic 370 of FIG. 4 whose nominal operation is described with reference to the state diagram of FIG. 7. In the upper left-hand corner of FIG. 7, each letter indicates the duration range of a tone burst. In the right-hand corner, each of the letters indicates the duration range of a silent interval. These are the inputs to logic 370 which are supplied by signal recognition circuit 314. These intervals are the typical timing indicia of legitimate coin deposit signals. Primed letter designations are utilized to indicate signal timing modifications experienced by the operation of tone detector 311.

In the diagram of FIG. 7, each of the five circles indicates the states of the flip-flops in output register 371. Register 371 includes three flip-flops designated as Nickel Status (NS) 372, Quarter Status (QS) 373 and Error Status (ES) 374. In FIG. 7, most of the circles contain a two-digit combination of one(s) and/or zero(s). The combination depicts the states of flip-flops 372 and 373 wherein the first digit indicates the status of QS flip-flop 373 while the second digit indicates the state of NS flip-flop 372. More specifically, a one indicates a set state of a flip-flop and the reset state is represented by a zero. The remaining circle which contains the letter E indicates the status of ES flip-flop 374. Whenever there is an error indication, this flip-flop is placed in the set state and produces an output which is used to override the coin status flip-flops of register 371.

When the overall receiver of FIG. 6 is in the idle state, no outputs are produced by signal recognition circuit 314 of FIG. 3 for coin status logic 370 of FIG. 4. Accordingly, the circuit of FIG. 3 is in the state of "00" depicted in the diagram of FIG. 7. In response to the occurrence of a detected tone burst that meets the preselected timing criteria of signal recognition circuit 314 of FIG. 3, this circuit provides the signals for coin status logic 370. The initial recognized output from circuit 314 will be an output that corresponds to one of the designated tone burst durations in FIG. 7. These outputs are provided directly from BTR register 338 of FIG. 3 or derived from them by logic gates. Although the diagram of FIG. 7 implies only positive logic application of the signals which provide the transitions between the different states, the actual circuit of logic 370 is reduced in complexity by utilizing both positive and complementary logic. For example, a logical "1" level depicted as the $\overline{D}$ signal is equivalent to either A, B or C and is therefore used as one of the inputs to AND gate 376 to set QS flip-flop 373. In other words, the $\overline{D}$ signal indicates a tone burst of a duration other than the longest duration signal range. Similarly, an $\overline{A}$ logic level is indicative of a tone burst of other than the shortest duration range and is used as one of the inputs to AND gate 377 to set NS flip-flop 372. This covers all the transitions necessary to get out of the initial state of "00".

If the signal which prompted the initial response is legitimate, the next output from signal recognition circuit 314 of FIG. 3 will classify the duration of the silent interval. More specifically, the silent interval will correspond to one of the four different categories in FIG. 7. These outputs are provided directly from STR register 356 or derived from these outputs. If the duration of the silent interval agrees with the duration of the tone burst as indicated in FIG. 1, the status of flip-flops 372 and 373 will not be changed.

If the duration of the tone burst corresponded to one of the intermediate categories, e.g., B or C, in FIG. 7, both flip-flops 372 and 373 would have been set. This is indicated by the "11" state in FIG. 7. The duration of the silent interval is then utilized to distinguish the quarter from the nickel or dime coin deposit signal. AND gate 378 provides a "1" signal to reset the QS flip-flop 373 via OR gate 375 corresponding to the condition in FIG. 7 of U or T (count $\neq$1). If the silent interval also falls within intermediate categories, subsequent burst durations are used to categorize the coin deposit signal. On the occurrence of the next tone burst, AND gate 379 may provide the transition from the "11" state to the "01" state corresponding to D or C (count $\neq$4) as shown in FIG. 7. On the other hand, if the next tone burst has a different duration AND gate 381 will produce a "1" output to reset NS flip-flop 372 via OR gate 385. The occurrence of the next silent interval may also accomplish the same transition by operation of AND gate 382. In some of the foregoing operations, the signal levels on conductors GD and GE are utilized. The GD and GE signal levels are determined, as can be seen in FIG. 4, by respective operation of gates 386–388 and gates 389–391.

If the coin category determined by duration of the silent interval conflicts with the coin category determined by duration of the detected tone burst, ES flip-flop 374 of FIG. 4 will be set. The output of this flip-flip in register 371 is used to override the outputs from the other flip-flops of the register in the output logic of FIG. 5. Seven conditions may occur which will set ES flip-flop 374. Three of these conditions will override the operation of status logic 370 notwithstanding the operation depicted by FIG. 7 while any one of the four remaining conditions will set ES flip-flop in accordance with operation shown in FIG. 7. The latter conditions will be considered first.

When QS flip-flop 373 and NS flip-flop 372 are in the set and reset states, respectively, i.e., state "10" in FIG. 7, AND gate 394 may produce a "1" output to set ES flip-flop 374 via OR gate 396. The condition that will produce the foregoing is a tone burst of long duration after a tone burst or silent interval of short duration, i.e., D or C (count $\neq$4). On the other hand, the same operation will occur in response to AND gate 397 when the absence of a tone burst produces an inconsistent silent interval, i.e., U or T (count $\neq$1).

The two remaining conditions occur when status logic 370 is in the state corresponding to "01" in FIG. 7. The first condition is the occurrence of a short tone burst after a tone burst or silent interval of long duration at which time the output of AND gate 398 switches to a "1" level. The other condition is the occurrence of a silent interval of short duration which is inconsistent with previous tone bursts or silent intervals of long duration. Then AND gate 399 produces a "1" output. OR gate 396 receives either of these outputs and passes them on to set ES flip-flop 374.

The final three error conditions are, as previously mentioned, not shown in FIG. 7. The occurrence of six tone bursts is indicated on BCD decoder 362 by a "1" on conductor C6 which sets ES flip-flop 374. If a tone burst has a duration longer than any in the permitted signal, MBT timer 319 provides a pulse on conductor AA which set ES flip-flop 374. Finally, the ES flip-flop will be set upon the occurrence of three, four or five tone bursts of long duration by operation of AND gate 401 which is enabled by OR gate 402. Repetition of any of these error conditions from a particular pay telephone station is probably indicative of a malfunctioning coin deposit signaling transmitter therein.

In FIG. 5, output logic 421 is a relatively straightforward logic circuit which receives information from status logic 370 in FIG. 4 and signal recognition circuit 314 of FIG. 3. In accordance with the state of QS 373, NS 372, and ES 374 flip-flops and the number of bursts received by BC counter 361, output logic 421 will deliver an output after an appropriate silent interval following the last received tone burst. The appropriate silent interval is different for each type coin denomination. As MST timer 321 in the signal recognition circuit 314 times the silent interval, it will produce a pulse for conductor X when the proper time for outputting a nickel denomination is reached, produce a pulse for conductor Q when the proper time for outputting a dime denomination is reached and for conductor L when the proper time for outputting a quarter denomination is reached. For a single quarter tone burst, the pulse will be present on conductor M. In addition to providing coin denomination outputs, output logic 421 provides signal processing (SP), timing error (TE), and a strobe output (SO). If ES flip-flop 374 had been set and three, four, five or six tone bursts had been received a timing error (TE) signal is outputted with the occurrence of the pulse on lead L, for other than those number of bursts received TE is produced with the occurrence of the pulse on lead Q. If at the time of the occurrence of the pulse on lead Q only two quarter bursts had been received, a TE signal is produced. Likewise if three or four bursts satisfying quarter or quarter and nickel/dime requirements had been received followed by a silent interval great enough for a pulse on L to occur, a TE signal will be produced.

SO output signals the presence of a final output which indicates a coin output or error output. As was mentioned previously this strobe output could also occur without a coin or an error output. This would indicate the receipt of a single quarter type burst. AND gate 428 is made high when a single quarter type burst is received. The major portion of output logic 421 includes a plurality of AND gates 425–430 all connected to be enabled by a "1" output or $\overline{ES}$ from ES flip-flop 374 when it is in the reset state. This output, of course, is a "0" level at times ES flip-flop 374 is set by the detection of an error condition. Thus NO, DO, and QO outputs will produce "1" level outputs only in the absence of an error condition.

The SP output from AND gate 434 is enabled via inverting gate 435. Gate 435 is activated by the response of OR gate 436 directly connected to the outputs of gates 425–428 and the outputs of AND gates 429–431 acting through OR gate 432. Gate 437 provides the TE output which is also one of the inputs of gate 436. The SP output provides a logical "1" level when no signal processing is being performed, a logical "0" level during coin signal processing, and reverts to a logical "1" beginning at the clock period when one of the TE, NO, DO and QO output signals is indicated or a single quarter burst is recognized. The SO output signal is a narrow pulse signal that occurs after the beginning of a coin denomination or error output pulse when these pulse values are stable. As mentioned previously it also occurs when the tone burst signal is identified as a single quarter type burst. AND gate 438 provides the SO output.

Figure 8A:
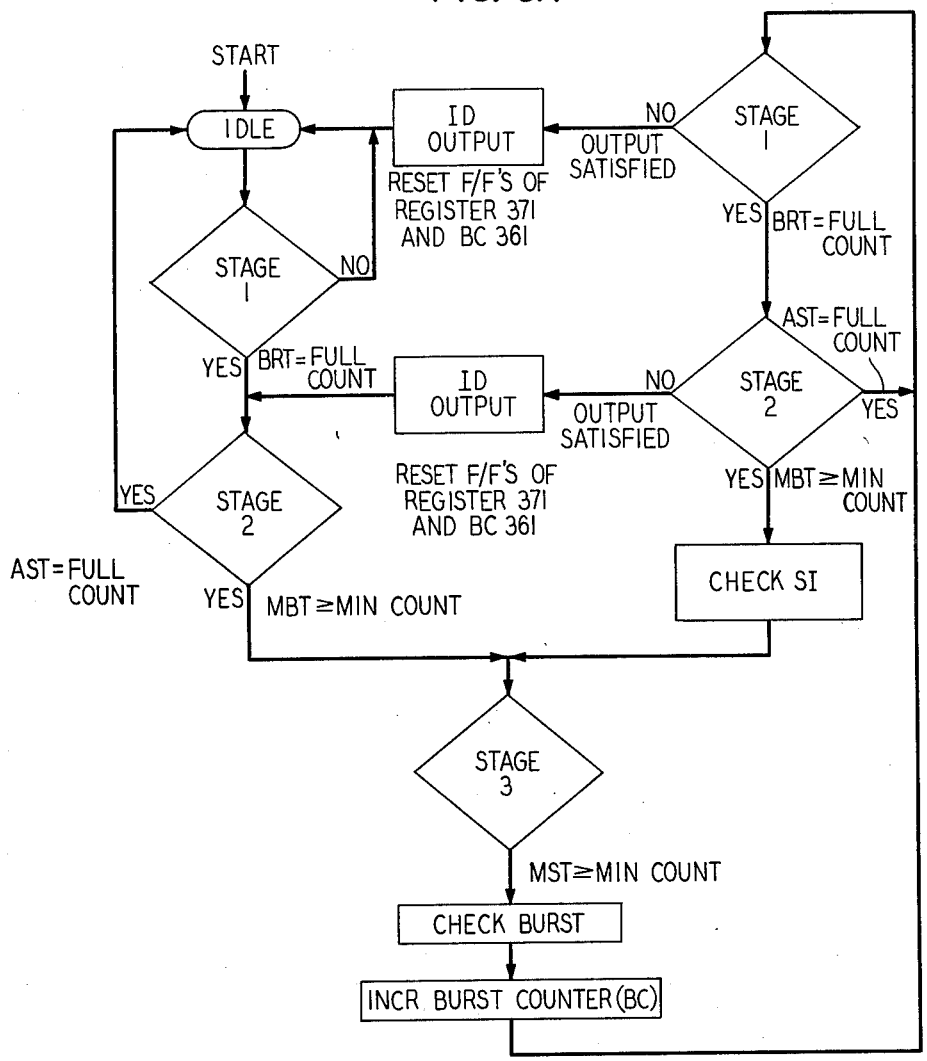
FIGS. 8A and 8B are, respectively, a flow chart and signal sequence used to provide a complete summary of the operation performed by the illustrative circuit diagram of FIGS. 3, 4 and 5.
Figure 8B:
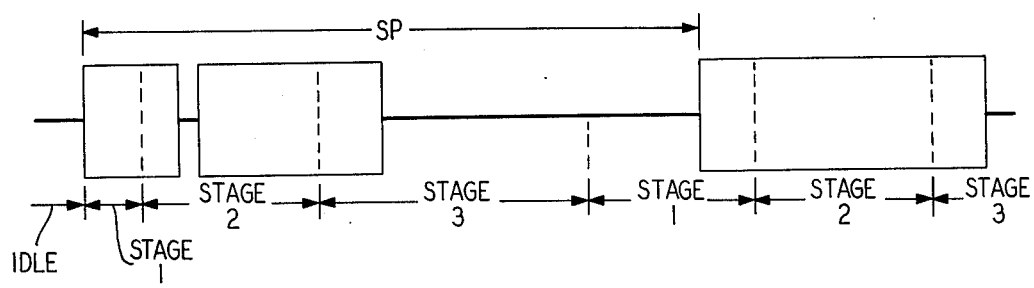

FIGS. 8A and 8B provide an overview of the operaton of the receiver of FIG. 6. FIG. 8A is a flow chart which basically shows the sequence of the various states used in recognizing and determining the validity of received signals. FIG. 8B is a waveform of the typical coin deposit signal for reference in discussing the response of the circuit of FIG. 6 to this signal. From the start position, the receiver automatically goes into the idle state. The diamond-shaped decision box labeled idle in stage 1 depicts operation on initial reception of a tone burst. A yes decision is satisfied when the Burst Recognition Timer reaches a given count. This satisfies the first criterion of signal persistence for a preselected duration.

The receiver then progresses to stage 2. In stage 2, either of two criteria must be satisfied to switch over to another phase. The first is regressive in that if the interruptions in the detected coin deposit tone burst accumulate so that the Assistant Silent Timer reaches a full count, the receiver returns back to the idle state. If the Main Burst Timer reaches a predetermined minimum count on the other hand, the minimum duration of a tone burst is satisfied and the receiver progresses to the third stage of signal recognition. Another feature of the second stage is that each time the Burst Recognition Timer arrives at a count indicative of the initial preselected persistence duration, the Assistant Silent Timer is cleared to zero count. This resetting action will occur until either of the two criteria are satisfied. Also, in the second stage of recognition, which is not shown in the diagram of FIG. 8A, is the mechanism for bridging momentary gaps in the detected tone burst signal. However, this was discussed in connection with bridging interruption timer 336 of signal recognition circuit 314.

In the third stage of recognition, the circuit of FIG. 6 seeks to measure the duration of the silent interval which is satisfied when the main silent timer reaches a preselected minimum count in response to the absence of the tone burst. At this point, the coin deposit receiver assumes that the tone burst portion of the coin deposit signal is over. Then the duration of the tone burst is indicated and the burst counter is incremented. In terms of the coin deposit signal, the initial stepping period of a coin deposit signal has occurred and the receiver returns to the first stage of recognition which is shown in the upper right-hand corner of FIG. 8A. If no subsequent stepping periods occur, the output is satisfied and the receiver produces an output and returns to the start position. However, if the Burst Recognition Timer arrives at a count indicative of the signal persistence duration the receiver proceeds to the second stage of recognition indicated on the right side of the flow chart and satisfies either of two criteria or produces an output. Except for the occurrence in the sequence which is indicated by a different position in FIG. 8A this stage 2 internally corresponds to that of the initial stage 2 in the flow chart. The silent interval is then checked and the receiver will progress to the third stage of recognition in response to additional stepping periods, i.e., a coin deposit signal indicative of a dime or quarter deposit.

In summary, the initial stepping period of a coin deposit signal progresses the circuit of FIG. 6 through the states in the left-hand portion of FIG. 8A. During the second stepping period and subsequent stepping periods, the circuit of FIG. 6 progresses through the same states in the right-hand portion of FIG. 8A. At either of these points in the right-hand portion of the flow chart, the receiver may produce an output depending upon the information provided by burst timing register 338, main silence timer 321, silent timing register 356 and burst counter 361 of signal recognition circuit 314.

Although an illustrative embodiment of the invention has been disclosed utilizing a plurality of timers interconnected and controlled by random logic to perform the basic process represented by the flow chart of FIG. 8A, a suitable alternative embodiment employing these inventive principles would be to utilize a microprocessor arrangement. Microprocessor technology is advancing rapidly to the point where it is becoming feasible to program a memory instead of building hardware to perform certain complex functions and processes. Of course, unlike a hardware arrangement in which a number of operations are performed concurrently and parallel, a microprocessor arrangement would perform equivalent functions in serial fashion. It is therefore contemplated that a microprocessor arrangement may be readily utilized to embody the process that utilizes the inventive principles disclosed herein.

Figure 9:
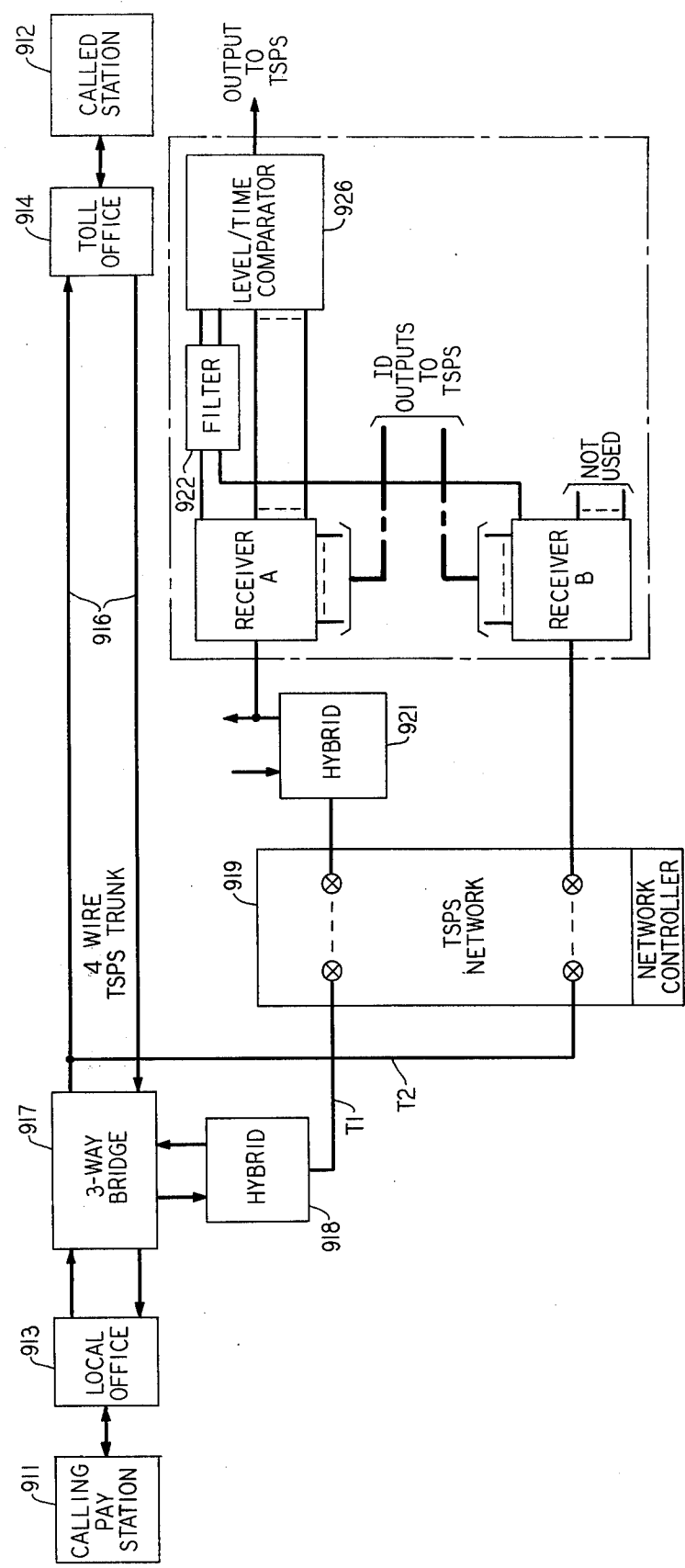
FIG. 9 illustrates an application of the principles of the invention in a telephone system.

FIG. 9 is a general diagram of a typical toll telephone connection between calling pay station 911 and called station 912. The arrangement of FIG. 9 is an illustrative application of the invention wherein two receivers A and B are utilized to identify the origin of coin deposit signals and thereby prevent called party fraud during intermediate coin collection intervals. Each of these receivers has the same circuit as the overall circuit diagram of FIG. 6. In this arrangement, the called party may also be at a pay station and deposit coins therein in response to overtime collection requests. Although the deposited coins will be automatically returned to the called party, station 912 will generate coin deposit signals which are normally indistinguishable from those emitted by station 911.

In FIG. 9 the two-way transmission path between stations 911 and 912 includes local office 913, toll office 914, four-wire TSPS trunk 916 and three-way bridge 917. Associated with bridge 917 is hybrid 918 which together provide the signal interface with TSPS network 919. Announcements of deposit instructions from TSPS network 919 for calling station 911 are introduced into the transmission path of bridge 917 between the two stations by hybrid 918 while signals indicative of deposited denominations are received therefrom. These signals are present on two-way circuit T1 and the coin signals are coupled to receiver A from TSPS network 919 via hybrid 921. These signals are also present on circuit T2 and applied to receiver B. The portion of FIG. 9 that is enclosed by dashed lines includes both receivers and is depicted in greater detail in FIG. 10. Coin deposit signals which orginated from called station 912 are stronger on circuit T1 than on circuit T2. The reason for the level difference is that the signal appearance on circuit T1 is through a rather direct signal path while a signal reflection due to an impedance mismatch is the cause of any signal appearance on circuit T2. This level difference is used by level/time comparator 926 to distinguish valid deposit signals from deposit signals of possible fraudulent origin.

Figure 10:
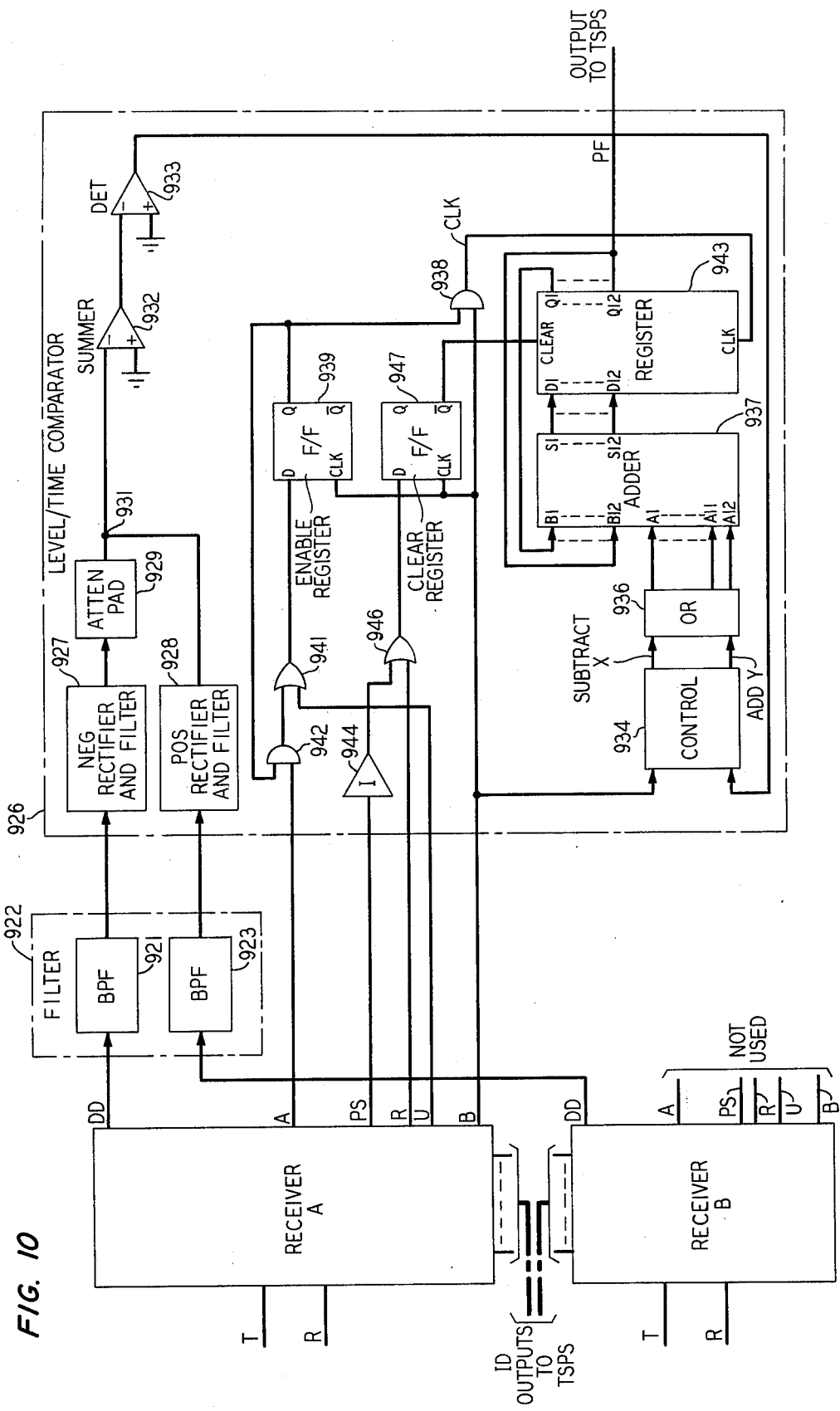
FIG. 10 is a detailed diagram of comparator circuitry employed with the dual receiver alignment applied in FIG. 9.

In FIG. 10, receivers A and B receiver their respective inputs from TSPS network 919. Each of these receivers in FIG. 10 has a plurality of outputs designated as dual receiver outputs as was previously mentioned in connection with the discussion of signal recognition circuit 314 of FIG. 3. DD is one of these outputs which provides AC signal energy in accordance with the signal energy applied to that particular receiver. Receiver A provides signal energy to bandpass filter 921 of filter 922 while receiver B provides signal energy to bandpass filter 923. Both bandpass filters in filter 922 are tuned to pass the same frequency band which corresponds to at least one of the frequencies present in the plurality of frequencies of the tone burst. The particular frequency band selected for filter 922 is a design choice of one skilled in the art. In this particular case, a single frequency was selected at which a minimum of voice signal energy would be present to interfere with the tone burst.

negative rectifier 927 and positive rectifier 928 respectively receive the output of BP filters 921 and 923. Each rectifier is full-wave and includes a low-pass filter to provide a smooth direct current output. The magnitude of the current from each filter is proportional to the magnitude of the signal applied to it by its filter. The output of rectifier 927 is applied to attenuating pad 929. Pad 929 reduces the magnitude of the negative output of rectifier 927 by a preselected value before it is combined with the output of rectifier 928 at node 931. Node 931 is positive only when the signal energy applied to receiver B is less than that of receiver A by an amount smaller than the loss of pad 929. The potential on node 931 is applied to the inverting input of summer 932 which, in turn, drives detector 933. Detector 933 provides a positive control signal indicative that the signal level difference applied to the two receivers is not sufficient to overcome the loss introduced by pad 929. This control signal is an amplified version of the same polarity as the potential on circuit junction 931. Introduction of loss by a passive element, i.e., pad 929, has the feature of being insensitive to power supply voltage fluctuation. Also it functions independent of absolute signal levels. Only the relative levels of the signals to the two receivers are involved.

When this control signal is positive, control 934 issues a signal to OR gate 936 whose output provides a digital signal indicative of a predesignated negative number X for adder 937. When the control signal is negative, the output of OR gate 936 provides a positive number Y for adder 937. Either number is entered into adder 937 once for each clock pulse when permitted by the remaining logic circuitry portion of comparator 926 in response to the other dual receiver outputs of receiver A.

The logic circuitry includes D-type flip-flop 939 whose output serves to enable AND gate 938 for passage of clock pulses to register 943 which cooperates with adder 937 to provide an accumulating function. Also included is D-type flip-flop 947 whose output serves to keep register 943 cleared during the time when receiver A is not processing a coin signal. During idle periods the processing status (PS) output from receiver A is low, so that by virtue of inverter 944 and OR gate 946 the clear register 947 will be set. Its $\bar{Q}$ output will be "0" maintaining register 943 clear. The input of flip-flop 939 is provided by OR gate 941 whose output is partially controlled by gate 942. One input to AND gate 942 is output A of receiver A. The A output from flip-flop 312 goes high to indicate the presence of a tone burst. However, AND gate 942 will not change its output in response to this input since the other input thereto is coupled to the output of flip-flop 939 which is initially at the zero level.

The other input of OR gate 941, which is coupled to the U output of receiver A, is therefore responsible for the initial change of state of flip-flop 939. The U output is provided by BRT timer 322 which goes high when the signal persistence criterion is satisfied. One clock pulse before this change on U, PS became "1", allowing the clear register 947 to reset and removing the clear from register 943. Upon the occurrence of the next clock pulse, the one level output of gate 941 is transferred to the output of flip-flop 939. The A output which is also high, together with the latching input to AND gate 942 from the output of flip-flop 939, provide the signal level responsible for maintaining the set state of flip-flop 939. This enables AND gate 938 which provides clock pulses to register 943. Therefore, either X is subtracted from the value stored in register 943 or Y is added to same at a rate corresponding to the clock signal. Note that the result of the comparison is allowed to accumulate in register 943 only after signal persistence is satisfied, indicating that the signal amplitudes have stabilized sufficiently to make comparison valid.

The accumulation operation of adder 937 and register 943 will continue as long as receiver A is detecting a tone burst signal. When a silent period begins the A output of receiver A goes low, disabling AND gate 942 and causing flip-flop 939 to become reset. AND gate 938 is disabled and blocks the application of clock pulses to register 943. This prevents the accumulation of amplitude comparisons when tones are non-existent or their amplitudes are too low. Register 943 now holds its count until the next burst is detected and its persistence is verified. At that time register 939 is re-enabled and register 943 can continue to add Y or subtract X depending upon the state of the comparator. As long as receiver A is processing the signal, the PS output thereof will be a high level so that inverter 944 provides a low level output to OR gate 946. Should the internal circuitry of receiver A decide that a coin signal is not being applied thereto which usually occurs when processing of a coin is completed, the output level on PS will go low. OR gate 946 will respond by providing a "1" output that sets flip-flop 947. The $\bar{Q}$ output of flip-flop 947 changes to a "0" level and clears the accumulated value stored in register 943.

If, on the other hand, receiver A continues processing the signal, the accumulation operation will take place during tone bursts throughout the duration of the signal processing. At the end of the processing, the coin denomination values will be signaled to the TSPS network at which time the Q12 output of register 943, PF, indicates the sign of the accumulation in the register. A negative sign is indicative of a valid coin deposit signal in that the level difference between receivers A and B is less than the loss introduced by pad 929. In other words, the comparison was within prescribed limits a fraction of the time that the signal was received by receiver A at least equal to Y, divided by X + Y. This percentage is obviously a fraction of the total duration of the signal bursts which provides a margin of tolerance to interference of the coin deposit signal by other signal energy presence in the telephone transmission paths of FIG. 9. As the coin denominations are signaled to TSPS the reset pulse on R sets clear register 947 via OR gate 946, thus clearing accumulator register 943. PS now goes low to maintain clear register 947 operated.

The inventive principles disclosed in the digital arrangement of comparator 926 may also be implemented using counters. Furthermore, the same principles can be applied using analog circuit techniques. For example, an analog integrator may be utilized having different rates of charging and discharging in accordance with the signal level comparison.

Although the invention and the numerous features thereon have been described in connection with particular embodiments for detecting coin deposit tones, it is to be understood that additional applications and embodiments which will be obvious to those skilled in the art are included within the spirit and scope of the invention. Thus, this invention is applicable to all detection applications in which particular signals are to be individually identified on the basis of timing format in an environment wherein the distinguishing timing format of a particular signal is subject to alternation by signal energy comprising random noises and/or speech. Also the level and time comparison feature illustrated in the dual receiver arrangement may be readily adapted to different multifrequency arrangements than are disclosed herein.

What is claimed is:

1. Apparatus for detecting and identifying disparate preselected signal sequences of spaced tone bursts corresponding to predetermined criteria wherein portions of the sequences may be subjected to signal interference, which comprises:

detecting means for providing an output signal indicative of the occurrence of a tone burst;

first timing means for indicting when said output signal persists continuously for a first predetermined duration;

second timing means responsive to said detecting means and said first timing means for measuring the total duration of said output signal while bridging interruptions therein after the first predetermined duration and indicating if the total exceeds a first predetermined minimum duration, said second means also accumulating the total duration of said interruptions to indicate if the accumulation exceeds a second predetermined duration to reset said apparatus into an initial state before the occurrence of said first predetermined minimum duration;

third timing means responsive to the indication of the end of said first minimum duration for measuring the total duration of interruptions that occur after said first minimum duration is exceeded to ascertain the end of said output signal and continuing to determine the duration of the space following the tone burst; and logic means responsive to said second and third timing means for indicating the occurrence of a valid one of said preselected signal sequences.

2. Apparatus according to claim 1 wherein said second timing means further includes means for measuring the duration of interruptions up to a prescribed bridging interval and indicating if interruptions exceed the prescribed interval to suspend the measurement of said second timing means until said output returns.

3. Apparatus according to claim 2 wherein said second timing means is responsive to said first timing means and resets said total duration of interruptions to zero when said output persists for said first predetermined duration.

4. Apparatus according to claim 3 wherein said logic means comprises storing means and gating means, said storing means maintaining the durations of tone bursts and spaces indicated respectively by said second and third timing means, and said gating means comparing the duration indications and indicating the occurrennce of a valid signal sequence and identifying the one that occurs when the duration indications are consistent with the criteria for one of said preselected signal sequence.

5. Apparatus according to claim 4 wherein said gating means is responsive to said second and third timing means and indicates the occurrence of an error in response to any one of a plurality of preselected error conditions, the indication of an error is used to override the indiction of a valid signal sequence, and the indication of an error is also used to identify possible malfunctions in apparatus that generated the preselected signal sequences.

6. Apparatus according to claim 5 further comprising counting means responsive to the duration indications of said third timing means, said counting means maintaining a count indicative of the number of occurrences of tone bursts in a received signal sequence, and said gating means responsive to said counting means and being used to identify a valid signal sequence if the number of tone bursts and the duration indications are consistent with the criteria for one of the preselected signal sequences.

7. Apparatus according to claim 6 further comprising resetting means responsive to the indications of valid signal sequences and indications of errors for returning said apparatus to said initial state for subsequent signal sequences.

8. A method of detecting and identifying disparate preselected signal sequences of spaced tone bursts corresponding to predetermined criteria wherein portions of the sequences may be subjected to signal interference comprising the steps of:

detecting the occurrence of tone bursts and indicating tone bursts that are continuously persistent throughout a first predetermined duration;

measuring the overall duration of detected tone bursts while bridging interruptions occurring therein after said first duration and indicating when the overall duration exceeds a predetermined minimum duration;

totaling a time accumulation of interruptions in the detected tone bursts after said first duration and indicating if the total interruption time exceeds a second predetermined interval to return said method to the original detecting step;

summing the interruption intervals that occur after said minimum duration in the detected tone bursts to determine the end of the first tone burst, and then continuing to determine the total duration of the space following the detected tone burst; and signaling the occurrence of a valid one of the preselected signal sequences.

9. A method according to claim 8 wherein the step of totaling further includes the step of resetting the accumulation of interruption time to zero each time the detected tone burst continues to persist continuously throughout the first predetermined duration.

10. A method according to claim 8 wherein the step of measuring the duration of detected tone bursts while bridging interruptions further includes the steps of:

determining the duration of each interruption up to a prescribed bridging interval;

continuing the measuring of the overall duration for the duration of each interruption up to the prescribed bridging interval, and suspending the measuring of the overall duration for the portion of each interruption which exceeds the prescribed bridging interval.

11. A method according to claim 10 which, after the step of suspending, further includes the step of providing bridging of interruptions again after the tone burst reoccurs and continuously persists throughout another of said first predetermined durations.

12. A method according to claim 11 wherein the step of signaling further includes the steps of:

counting the number of detected tone bursts in spaces in a signal sequence;

comparing the durations and number of detected tone bursts and spaces with the criteria for valid signal sequences, and identifying a valid signal sequence when the comparison is consistent with one of the preselected signal sequences.

13. In a telephone system wherein a calling coin station signals coin deposits by preselected signal sequences of spaced tone bursts while transmission circuits are complete to the called party, automatic coin detection apparatus which comprises:

a first coin deposit signal receiver for detecting and identifying coin deposit signals present in a first portion of the transmission circuits, a second coin deposit signal receiver for detecting and identifying coin deposit signals present in a second portion of the transmission circuits, each of said receivers producing an analog output having an amplitude proportional to the tone burst portion of coin deposit signals in the respective portions of the transmission circuits, and comparing means for comparing the analog signal levels produced by the outputs of said receivers for indicating when the difference in levels of the analog signals is within a prescribed limit at least for a preselected portion of the time analog signals are present to validate the received signal sequence.

14. In a telephone system, automatic coin detection apparatus in accordance with claim 13 wherein said comparing means further comprises accumulating means to determine said preselected portion, said accumulating means being incremented at a uniform rate by a first preselected positive number when the difference in levels is outside said limit, said accumulating means being incremented at said rate by a second preselected negative number when the difference in levels is within said limit and said accumulating means providing an output to indicate the accumulation of a negative total when the difference in levels is within said limit for a fraction of the time at least equal to said preselected portion.

* * * * *

UNITED STATES PATENT AND TRADEMARK OFFICE
CERTIFICATE OF CORRECTION

PATENT NO. : 4,076,962

DATED : February 28, 1978

INVENTOR(S) : Kenneth Streisand

It is certified that error appears in the above-identified patent and that said Letters Patent are hereby corrected as shown below:

Column 4, line 36, "limitators" should read --limitors--.
Column 5, line 5, "total" should read --tone--; line 6, "whch" should read --which--; line 39, "line" should read --input--.  Column 6, line 9, "312" should read --321--; line 66, "W" should read --$\overline{W}$--.  Column 8, line 2, "BRT" should read --BTR--; line 58, "pules" should read --pulses--.
Column 9, line 8, "long" should read --low--.  Column 15, line 36, "receiver" should read --receive--; line 55, "negative" should read --Negative--.

Signed and Sealed this

Third Day of October 1978

[SEAL]

Attest:

RUTH C. MASON
Attesting Officer

DONALD W. BANNER
Commissioner of Patents and Trademarks